United States Patent
Ding et al.

(10) Patent No.: US 9,817,235 B2
(45) Date of Patent: Nov. 14, 2017

(54) METHOD AND APPARATUS FOR PROMPTING BASED ON SMART GLASSES

(71) Applicant: Baidu Online Network Technology (Beijing) Co., Ltd., Beijing (CN)

(72) Inventors: Errui Ding, Beijing (CN); Zhongqin Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 11 days.

(21) Appl. No.: 14/585,139

(22) Filed: Dec. 29, 2014

(65) Prior Publication Data

US 2015/0293359 A1 Oct. 15, 2015
US 2017/0205629 A9 Jul. 20, 2017

(30) Foreign Application Priority Data

Apr. 4, 2014 (CN) .......................... 2014 1 0137386

(51) Int. Cl.
G02B 27/01 (2006.01)
(52) U.S. Cl.
CPC .. *G02B 27/0172* (2013.01); *G02B 2027/0178* (2013.01)
(58) Field of Classification Search
CPC .............. G02B 27/0172; G02B 27/017; G02B 2027/0178; G02B 2027/0187
USPC .......................................................... 345/8
See application file for complete search history.

(56) References Cited

U.S. PATENT DOCUMENTS

| 2013/0147686 A1* | 6/2013 | Clavin | G06F 3/013 345/8 |
| 2014/0012674 A1* | 1/2014 | Piccionielli | G06Q 30/0257 705/14.55 |
| 2014/0292653 A1* | 10/2014 | Kamba | G06T 19/006 345/157 |
| 2014/0294257 A1* | 10/2014 | Tussy | G06F 17/30247 382/118 |
| 2014/0333521 A1* | 11/2014 | Hwang | G06F 3/013 345/156 |

FOREIGN PATENT DOCUMENTS

| JP | 2012-155362 A | 8/2012 |
| JP | 2012-155403 A | 8/2012 |
| JP | 2013-54661 A | 3/2013 |

OTHER PUBLICATIONS

Notification of Provisional Rejection, Korean Patent Application No. 10-2014-0194551.

* cited by examiner

*Primary Examiner* — Towfiq Elahi
(74) *Attorney, Agent, or Firm* — Orrick, Herrington & Sutcliffe LLP

(57) ABSTRACT

The present invention proposes a method and apparatus for prompting based on smart glasses. The method comprises: acquiring current scenario information; determining prompt information corresponding to the current scenario information according to a preconfigured information base, the information base storing at least one kind of scenario information and prompt information corresponding to each kind of scenario information; and displaying the prompt information by means of the smart glasses. The method can facilitate the acquisition of prompt information corresponding to a scenario by a user.

20 Claims, 2 Drawing Sheets

METHOD AND APPARATUS FOR PROMPTING BASED ON SMART GLASSES

CROSS-REFERENCE TO RELATED APPLICATIONS

The present application claims priority to Chinese Patent Application No. CN201410137386.0, filed on Apr. 4, 2014, the entire disclosure of which is incorporated herein by reference in its entirety and for all purposes.

TECHNICAL FIELD

The present invention relates to the technical field of data processing, and in particular to a method and apparatus for prompting based on smart glasses.

BACKGROUND

People need to acquire prompt information according to scenario information on many occasions. For example, when explaining a PPT or wanting to know about a certain celebrity while watching a movie, it is often necessary to perform certain additional interpretation on the scenario, such as the current page of the PPT or the current frame of the movie.

It is usually inconvenient to acquire this kind of prompt information. For example, people need to browse their own computer screen quite often when explaining a PPT, or even cannot acquire related information when, for example, watching a movie.

SUMMARY

The present invention is intended to solve one of the technical problems in the related art at least to some extent.

For this purpose, one objective of the present invention is to propose a method for prompting based on smart glasses, and the method can facilitate the acquisition of prompt information corresponding to a scenario by a user.

Another objective of the present invention is to propose a type of smart glasses.

In order to achieve the objective mentioned above, a method for prompting based on smart glasses proposed by an embodiment from a first aspect of the present invention comprises: acquiring current scenario information; determining prompt information corresponding to the current scenario information according to a preconfigured information base, the information base storing at least one kind of scenario information and prompt information corresponding to each kind of scenario information; and displaying the prompt information by means of the smart glasses.

The method for prompting based on smart glasses proposed by the embodiment from the first aspect of the present invention can facilitate a user in seeing prompt information corresponding to the current scenario and improve user experience by means of acquiring the prompt information corresponding to the current scenario information and displaying same by means of the smart glasses.

In order to achieve the objective mentioned above, an apparatus for prompting based on smart glasses proposed by a an embodiment form a second aspect of the present invention comprises: an acquisition module for acquiring current scenario information; a determination module for determining prompt information corresponding to the current scenario information according to a preconfigured information base, the information base storing at least one kind of scenario information and prompt information corresponding to each kind of scenario information; and a display module for displaying the prompt information by means of the smart glasses.

The apparatus for prompting based on smart glasses proposed by the embodiment from a second aspect of the present invention can facilitate a user in seeing prompt information corresponding to the current scenario and improve user experience by means of acquiring the prompt information corresponding to the current scenario information and displaying same by means of the smart glasses.

In order to achieve the objective mentioned above, smart glasses proposed by an embodiment from a third aspect of the present invention comprise: a housing, a processor, a memory, a circuit board and a power supply circuit, wherein the circuit board is arranged inside a space enclosed by the housing, and the processor and the memory are disposed on the circuit board; the power supply circuit is used for supplying power to various circuits or devices of the smart glasses; the memory is used for storing executable program codes; and the processor operates programs corresponding to the executable program codes by reading the executable program codes stored in the memory for carrying out the steps of: acquiring current scenario information; determining prompt information corresponding to the current scenario information according to a preconfigured information base, the information base storing at least one kind of scenario information and prompt information corresponding to each kind of scenario information; and displaying the prompt information by means of the smart glasses.

The smart glasses proposed by the embodiment from the third aspect of the present invention can facilitate a user in seeing prompt information corresponding to the current scenario and improve user experience by means of acquiring the prompt information corresponding to the current scenario information and displaying same by means of the smart glasses.

The additional aspects and advantages of the present invention will be provided in part in the description below, and will become apparent in part from the description below, or be understood by means of practice of the present invention.

BRIEF DESCRIPTION OF THE ACCOMPANYING DRAWINGS

The above-mentioned and/or additional aspects and advantages of the present invention will become apparent and easily understood from the following description of the embodiments in conjunction with the accompanying drawings, in which.

DETAILED DESCRIPTION OF THE PREFERRED EMBODIMENTS

Figure 1:
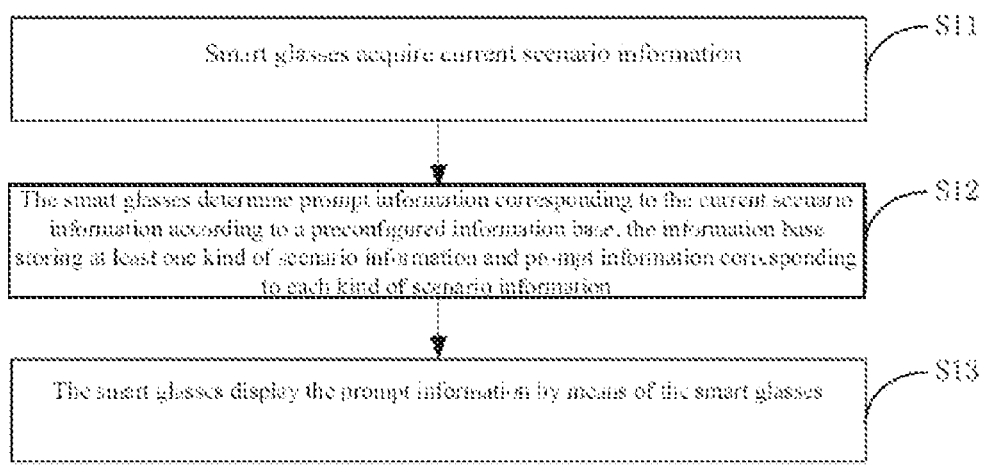
FIG. 1 is a schematic flowchart of a method for prompting based on smart glasses proposed by one embodiment of the present invention.

The embodiments of the present invention will be described in detail below, and examples of the embodiments are shown in the accompanying drawings, in which the same or similar reference numerals represent the same or similar elements or elements having the same or similar functions throughout. The embodiments described below by referring to the accompanying drawings are exemplary and are merely used to explain the present invention, rather than being understood as limitations to the present invention. On the contrary, the embodiments of the present invention include all the changes, modifications and equivalents falling into the scope of the spirit and principles of the appended claims.

FIG. 1 is a schematic flowchart of a method for prompting based on smart glasses proposed by one embodiment of the present invention, the method comprising:

S11: the smart glasses acquire current scenario information.

The smart glasses are an emerging smart device wearable on the head. The smart glasses, like a smart phone, have an independent operating system, may be installed with programs like software and games by a user, be operated and controlled to implement functions such as agenda addition, map navigation, friend interaction, photo capturing and video capturing, video chatting with friends, etc., and may implement wireless network access via a mobile communication network.

The current scenario information may be acquired by way of images or by way of device interconnection.

By way of images means to capture the current scenario to acquire an image of the current scenario, while by way of device interconnection means that a device on which the current scenario is located sends the current scenario information to the smart glasses.

Furthermore, capturing the current scenario may be continuous capturing, or capturing after receiving an event trigger instruction. For example, continuous capturing is started when Microsoft Corporation's Powerpoint (PPT) is enabled or a movie starts to play, so as to acquire an image of the current scenario. Alternatively, when the current scenario is to be captured, an event trigger instruction such as a touch instruction or a voice control instruction is used to start capturing the current scenario. The trigger instruction or voice control instruction may be sent by a user; in addition, the user may also send a trigger instruction to the smart glasses by means of another device, so as to start capturing the current scenario.

By way of device interconnection, for example, the page number of the PPT that is currently played by a computer and the like may be sent to a smart device.

S12: the smart glasses determine prompt information corresponding to the current scenario information according to a preconfigured information base, the information base storing at least one kind of scenario information and prompt information corresponding to each kind of scenario information;

wherein the information base records an association relationship between the scenario information and the prompt information, through which the prompt information corresponding to the current scenario information can be found.

The current scenario information is, for example, an image of the PPT page currently played, and the information base saves the image of the PPT page and the corresponding prompt information which indicates, for example, the content that needs to be extended in the current PPT page. Alternatively, the current scenario information is a video frame currently played, the video frame comprising a face or faces of a certain celebrity or some celebrities, and the information base saves the face of a celebrity and information related to that celebrity, for example, a correlation between information such as the name, and experience, in which facial recognition technology may be used to acquire a face from the current video frame.

S13: the smart glasses display the prompt information by means of the smart glasses.

For example, when explaining a PPT, the content that needs to be extended and is not displayed on the projector may be displayed, or when a celebrity is seen, data related to that celebrity may be displayed.

This embodiment can facilitate a user in seeing prompt information corresponding to the current scenario and improve user experience by means of acquiring the prompt information corresponding to the current scenario information and displaying same by means of the smart glasses.

Figure 2:
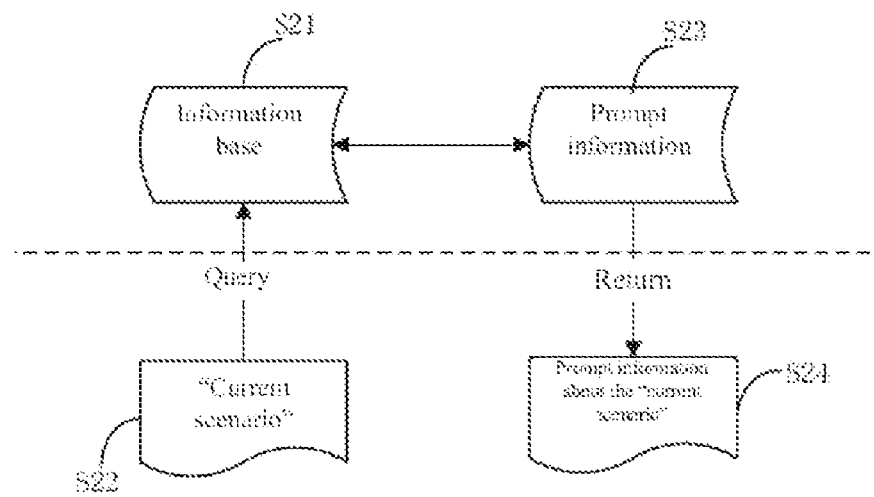
FIG. 2 is a schematic flowchart of a method for prompting based on smart glasses proposed by another embodiment of the present invention.

FIG. 2 is a schematic flowchart of a method for prompting based on smart glasses proposed by another embodiment of the present invention, the method comprising:

S21: an information base is established.

The information base saves at least one kind of scenario information and prompt information corresponding to each kind of scenario information. By means of establishing an information base, scenario information and prompt information may be associated.

The scenario information and the corresponding prompt information may be information set by a user himself, or information acquired from public resources.

For example, when explaining a PPT, the user may, in advance, input in the information base each page of PPT picture and corresponding prompt information set by himself, or set the page number of the PPT and the corresponding prompt information; or the user may input in the information base the scenario information and the corresponding prompt information acquired from public resources. For example, as to celebrities, the faces of these celebrities and the corresponding celebrity information may be acquired from public resources.

S22: current scenario information is acquired.

The current scenario information may be acquired by way of images or by way of device interconnection.

By way of images means to capture the current scenario to acquire an image of the current scenario, while by way of device interconnection means that a device on which the current scenario is located sends the current scenario information to the smart glasses.

Furthermore, capturing the current scenario may be continuous capturing, or capturing after receiving an event trigger instruction. For example, continuous capturing is started when PPT is enabled or a movie starts to play, so as to acquire an image of the current scenario. Alternatively, when the current scenario is to be captured, an event trigger instruction such as a touch instruction or a voice control instruction is used to start capturing the current scenario. The trigger instruction or voice control instruction may be sent by a user; in addition, the user may also send a trigger instruction to the smart glasses by means of another device, so as to start capturing the current scenario.

By way of device interconnection, for example, the page number of the PPT that is currently played by a computer and the like may be sent to a smart device.

S23: prompt information corresponding to the current scenario information is determined in the information base.

For example, the current scenario information is, an image of the PPT page currently played, and the information base saves the image of the PPT page and the corresponding prompt information which indicates, for example, the content that needs to be extended in the current PPT page.

Alternatively, the current scenario information is a video frame currently played, the video frame comprising a face or faces of a certain celebrity or some celebrities, and the information base saves the face of a celebrity and information related to that celebrity, for example, a correlation between information such as the name, and experience, in which facial recognition technology may be used to acquire a face from the current video frame.

S24: the prompt information is displayed by means of the smart glasses in real time.

For example, when explaining a PPT, the content that needs to be extended and is not displayed on the projector may be displayed, or when a celebrity is seen, data related to that celebrity may be displayed.

The above-mentioned prompt information may be displayed at a location above the right eye of the smart glasses.

Furthermore, before the display of the prompt information, whether the prompt information needs to be displayed may be judged, so as to display same only when needed. A button may be set in advance, the button being used for enabling or disabling all the prompt information, and when the button is enabled, the current scenario information and the corresponding prompt information are displayed after being acquired. Alternatively, a part of the prompt information may also be enabled or disabled, for example, displaying the corresponding prompt information when the current scenario meets a set condition, otherwise not displaying same. The set condition may be the time when the user stares at a scenario, and the corresponding prompt information is displayed only when the time exceeds a set threshold. For example, the location where the user's eyeball stares is captured by means of an arranged sensor, and when the time of staring exceeds a set threshold, the corresponding prompt information, such as the face of a certain celebrity, is displayed at the location.

Furthermore, real-time display of prompt information is taken as an example above, and non-real-time display may also be performed.

This embodiment, by means of establishing an information base, may find prompt information corresponding to current scenario information in the information base, and by means of showing the prompt information on smart glasses, may enable a user to see the prompt information directly without acquiring same from another device, which facilitates the acquisition of the prompt information by the user, and by means of displaying the prompt information in real time, may enable the user to acquire the corresponding prompt information in real time according to the current scenario and may improve user experience. Displaying on the smart glasses may enrich device functions.

Figure 3:
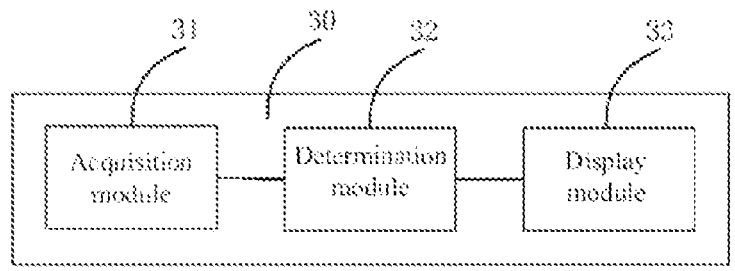
FIG. 3 is a structural schematic diagram of an apparatus for prompting based on smart glasses proposed by another embodiment of the present invention.

FIG. 3 is a structural schematic diagram of an apparatus for prompting based on smart glasses proposed by another embodiment of the present invention. The apparatus 30 comprises an acquisition module 31, a determination module 32 and a display module 33.

The acquisition module 31 is used for acquiring current scenario information;

the current scenario information may be acquired by way of images or by way of device interconnection.

By way of images means to capture the current scenario to acquire an image of the current scenario, while by way of device interconnection means that a device on which the current scenario is located sends the current scenario information to the smart glasses.

Furthermore, capturing the current scenario may be continuous capturing, or capturing performed after receiving an event trigger instruction. For example, continuous capturing is started when PPT is enabled or a movie starts to play, so as to acquire an image of the current scenario. Alternatively, the current scenario is to be captured, an event trigger instruction such as a touch instruction or a voice control instruction is used to start capturing the current scenario. The trigger instruction or voice control instruction may be sent by a user; in addition, the user may also send a trigger instruction to the smart glasses by means of another device, so as to start capturing the current scenario.

By way of device interconnection, for example, the page number of the PPT that is currently played by a computer and the like may be sent to a smart device.

The determination module 32 is used for determining prompt information corresponding to the current scenario information according to a preconfigured information base, the information base storing at least one kind of scenario information and prompt information corresponding to each kind of scenario information;

wherein the information base records an association relationship between the scenario information and the prompt information, through which the prompt information corresponding to the current scenario information can be found.

The current scenario information is, for example, an image of the PPT page currently played, and the information base saves the image of the PPT page and the corresponding prompt information which indicates, for example, the content that needs to be extended in the current PPT page. Alternatively, the current scenario information is a video frame currently played, the video frame comprising a face or faces of a certain celebrity or some celebrities, and the information base saves the face of a celebrity and information related to that celebrity, for example, a correlation between information such as the name, and experience, in which facial recognition technology may be used to acquire a face from the current video frame.

The display module 33 is used for displaying the prompt information by means of the smart glasses.

For example, when explaining a PPT, the content that needs to be extended and is not displayed on the projector may be displayed, or when a celebrity is seen, data related to that celebrity may be displayed.

This embodiment can facilitate a user in seeing prompt information corresponding to the current scenario and improve user experience by means of acquiring the prompt information corresponding to the current scenario information and displaying same by means of the smart glasses.

Figure 4:
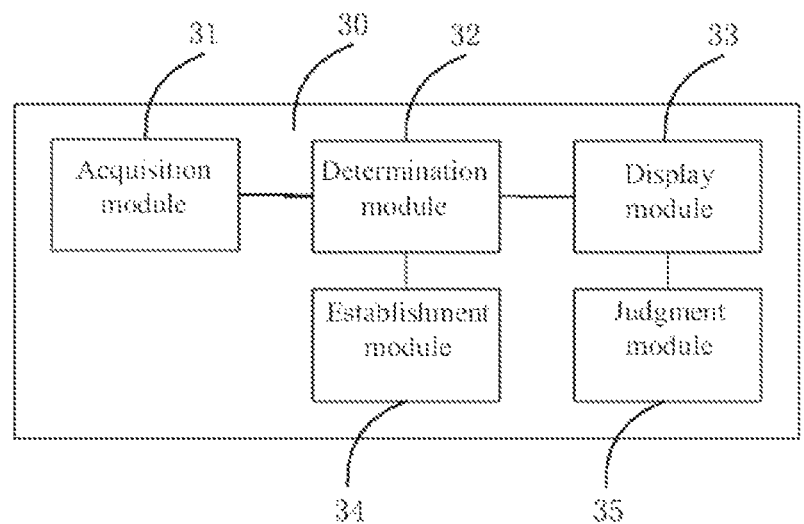
FIG. 4 is a structural schematic diagram of an apparatus for prompting based on smart glasses proposed by another embodiment of the present invention.

FIG. 4 is a structural schematic diagram of an apparatus for prompting based on smart glasses proposed by another embodiment of the present invention. The apparatus 30 further comprises an establishment module 34 used for establishing the information base.

The establishment module 34 is specifically used for: saving scenario information set by a user and prompt information corresponding to the scenario information in the information base; or saving scenario information acquired by the user from public resources and prompt information corresponding to the scenario information in the information base.

The information base saves at least one kind of scenario information and prompt information corresponding to each kind of scenario information. By means of establishing an information base, scenario information and prompt information may be associated.

The scenario information and the corresponding prompt information may be information set by a user himself, or information acquired from public resources.

For example, when explaining a PPT, the user may, in advance, input in the information base each page of PPT picture and corresponding prompt information set by himself, or set the page number of the PPT and the corresponding prompt information; or the user may input in the information base the scenario information and the corresponding prompt information acquired from public resources. For example, as to celebrities, the faces of these celebrities and the corresponding celebrity information may be acquired from public resources.

In another embodiment, the acquisition module 31 is specifically used for: capturing a current scenario to acquire an image of the current scenario.

In another embodiment, the acquisition module is further specifically used for: capturing the scenario continuously to acquire an image of the current scenario; or capturing the current scenario according to an event trigger instruction.

In another embodiment, the event trigger instruction used by the acquisition module comprises: a touch instruction or a voice control instruction given by the user; or a trigger instruction sent by the user via another device.

In another embodiment, the acquisition module is specifically used for: receiving the current scenario information sent by a device on which the current scenario is located.

The current scenario information may be acquired by way of images or by way of device interconnection.

By way of images means to capture the current scenario to acquire an image of the current scenario, while by way of device interconnection means that a device on which the current scenario is located sends the current scenario information to the smart glasses.

Furthermore, capturing the current scenario may be continuous capturing, or capturing after receiving an event trigger instruction. For example, continuous capturing is started when PPT is enabled or a movie starts to play, so as to acquire an image of the current scenario. Alternatively, when the current scenario is to be captured, an event trigger instruction such as a touch instruction or a voice control instruction is used to start capturing the current scenario. The trigger instruction or voice control instruction may be sent by a user; in addition, the user may also send a trigger instruction to the smart glasses by means of another device, so as to start capturing the current scenario.

By way of device interconnection, for example, the page number of the PPT that is currently played by a computer and the like may be sent to a smart device.

In another embodiment, the apparatus 30 further comprises a judgment module 35.

The judgment module 35 is used for judging whether the prompt information corresponding to the current scenario information needs to be displayed, so as to display the prompt information by means of the smart glasses when it is judged that same needs to be displayed.

In another embodiment, the judgment module 35 is specifically used for: if the user chooses to enable all prompt information, judging that same needs to be displayed; or if the user chooses to enable the prompt information corresponding to the current scenario, judging that same needs to be displayed.

A button may be set in advance, the button being used for enabling or disabling all the prompt information, and when the button is enabled, the current scenario information and the corresponding prompt information are displayed after being acquired. Alternatively, a part of the prompt information may also be enabled or disabled, for example, displaying the corresponding prompt information when the current scenario meets a set condition, otherwise not displaying same. The set condition may be the time when the user stares at a scenario, and the corresponding prompt information is displayed only when the time exceeds a set threshold. For example, the location where the user's eyeball stares is captured by means of an arranged sensor, and when the time of staring exceeds a set threshold, the corresponding prompt information, such as the face of a certain celebrity, is displayed at the location.

Furthermore, the above-mentioned prompt information may be displayed in real time, and may also be displayed not in real time.

This embodiment, by means of establishing an information base, may find prompt information corresponding to current scenario information in the information base, and by means of showing the prompt information on smart glasses, may enable a user to see the prompt information directly without acquiring same from another device, which facilitates the acquisition of the prompt information by the user, and by means of displaying the prompt information in real time, may enable the user to acquire the corresponding prompt information in real time according to the current scenario and may improve user experience. Displaying on the smart glasses may enrich device functions.

The embodiments of the present invention further provide a client device, the client device comprising: a housing, a processor, a memory, a circuit board and a power supply circuit, wherein the circuit board is mounted inside a space enclosed by the housing, and the processor and the memory are disposed on the circuit board; the power supply circuit is used for supplying power to various circuits or devices of the client device; the memory is used for storing executable program codes; and the processor operates programs corresponding to the executable program codes by reading the executable program codes stored in the memory for carrying out the steps as follows:

S11': the smart glasses acquire current scenario information.

The smart glasses are an emerging smart device wearable on the head. The smart glasses, like a smart phone, have an independent operating system, may be installed with programs like software and games by a user, be operated and controlled to implement functions such as agenda addition, map navigation, friend interaction, photo capturing and video capturing, video chatting with friends, etc., and may implement wireless network access via a mobile communication network.

The current scenario information may be acquired by way of images or by way of device interconnection.

By way of images means to capture the current scenario to acquire an image of the current scenario, while by way of device interconnection means that a device on which the current scenario is located sends the current scenario information to the smart glasses.

Furthermore, capturing the current scenario may be continuous capturing, or capturing after receiving an event trigger instruction. For example, continuous capturing is started when PPT is enabled or a movie starts to play, so as to acquire an image of the current scenario. Alternatively, when the current scenario is to be captured, an event trigger instruction such as a touch instruction or a voice control instruction is used to start capturing the current scenario. The trigger instruction or voice control instruction may be sent by a user; in addition, the user may also send a trigger instruction to the smart glasses by means of another device, so as to start capturing the current scenario.

By way of device interconnection, for example, the page number of the PPT that is currently played by a computer and the like may be sent to a smart device.

S12': the smart glasses determine prompt information corresponding to the current scenario information according to a preconfigured information base, the information base storing at least one kind of scenario information and prompt information corresponding to each kind of scenario information;

wherein the information base records an association relationship between the scenario information and the prompt information, through which the prompt information corresponding to the current scenario information can be found.

The current scenario information is, for example, an image of the PPT page currently played, and the information base saves the image of the PPT page and the corresponding prompt information which indicates, for example, the content that needs to be extended in the current PPT page. Alternatively, the current scenario information is a video frame currently played, the video frame comprising a face or faces of a certain celebrity or some celebrities, and the information base saves the face of a celebrity and information related to that celebrity, for example, a correlation between information such as the name, and experience, in which facial recognition technology may be used to acquire a face from the current video frame.

S13': the smart glasses display the prompt information by means of the smart glasses.

For example, when explaining a PPT, the content that needs to be extended and is not displayed on the projector may be displayed, or when a celebrity is seen, data related to that celebrity may be displayed.

This embodiment can facilitate a user in seeing prompt information corresponding to the current scenario and improve user experience by means of acquiring the prompt information corresponding to the current scenario information and displaying same by means of the smart glasses.

In another embodiment, the processor operates programs corresponding to executable program codes by reading the executable program codes stored in the memory for carrying out the steps as follows:

S21': an information base is established.

The information base saves at least one kind of scenario information and prompt information corresponding to each kind of scenario information. By means of establishing an information base, scenario information and prompt information may be associated.

The scenario information and the corresponding prompt information may be information set by a user himself, or information acquired from public resources.

For example, when explaining a PPT, the user may, in advance, input in the information base each page of PPT picture and corresponding prompt information set by himself, or set the page number of the PPT and the corresponding prompt information; or the user may input in the information base the scenario information and the corresponding prompt information acquired from public resources. For example, as to celebrities, the faces of these celebrities and the corresponding celebrity information may be acquired from public resources.

S22': current scenario information is acquired.

The current scenario information may be acquired by way of images or by way of device interconnection.

By way of images means to capture the current scenario to acquire an image of the current scenario, while by way of device interconnection means that a device on which the current scenario is located sends the current scenario information to the smart glasses.

Furthermore, capturing the current scenario may be continuous capturing, or capturing after receiving an event trigger instruction. For example, continuous capturing is started when PPT is enabled or a movie starts to play, so as to acquire an image of the current scenario. Alternatively, when the current scenario is to be captured, an event trigger instruction such as a touch instruction or a voice control instruction is used to start capturing the current scenario. The trigger instruction or voice control instruction may be sent by a user; in addition, the user may also send a trigger instruction to the smart glasses by means of another device, so as to start capturing the current scenario.

By way of device interconnection, for example, the page number of the PPT that is currently played by a computer and the like may be sent to a smart device.

S23': prompt information corresponding to the current scenario information is determined in the information base.

For example, the current scenario information is, an image of the PPT page currently played, and the information base saves the image of the PPT page and the corresponding prompt information which indicates, for example, the content that needs to be extended in the current PPT page. Alternatively, the current scenario information is a video frame currently played, the video frame comprising a face or faces of a certain celebrity or some celebrities, and the information base saves the face of a celebrity and information related to that celebrity, for example, a correlation between information such as the name, and experience, in which facial recognition technology may be used to acquire a face from the current video frame.

S24': the prompt information is displayed by means of the smart glasses in real time.

For example, when explaining a PPT, the content that needs to be extended and is not displayed on the projector may be displayed, or when a celebrity is seen, data related to that celebrity may be displayed.

The above-mentioned prompt information may be displayed at a location above the right eye of the smart glasses.

Furthermore, before the display of the prompt information, whether the prompt information needs to be displayed may be judged, so as to display same only when needed. A button may be set in advance, the button being used for enabling or disabling all the prompt information, and when the button is enabled, the current scenario information and the corresponding prompt information are displayed after being acquired. Alternatively, a part of the prompt information may also be enabled or disabled, for example, displaying the corresponding prompt information when the current scenario meets a set condition, otherwise not displaying same. The set condition may be the time when the user stares at a scenario, and the corresponding prompt information is displayed only when the time exceeds a set threshold. For example, the location where the user's eyeball stares is captured by means of an arranged sensor, and when the time of staring exceeds a set threshold, the corresponding prompt information, such as the face of a certain celebrity, is displayed at the location.

Furthermore, real-time display of prompt information is taken as an example above, and non-real-time display may also be performed.

This embodiment, by means of establishing an information base, may find prompt information corresponding to current scenario information in the information base, and by means of showing the prompt information on smart glasses, may enable a user to see the prompt information directly without acquiring same from another device, which facilitates the acquisition of the prompt information by the user, and by means of displaying the prompt information in real time, may enable the user to acquire the corresponding prompt information in real time according to the current scenario and may improve user experience. Displaying on the smart glasses may enrich device functions.

It should be noted that in the description of the present invention, the terms "first" and "second" are merely for descriptive purposes, rather than being understood to indicate or imply relative importance. Furthermore, in the description of the present invention, unless otherwise specified, the meaning of "a plurality" is two or more than two.

Any process or method description in the flowchart or otherwise described herein may be understood to represent a module, segment or section comprising one or more codes of executable instructions used for implementing a particular logical function or process step, and the scope of the preferred embodiments of the present invention comprises further implementations, where functions may be carried out not according to the order shown or discussed, comprising according to a basically synchronous manner or an inverse order in accordance with involved functions, and this should be understood by those skilled in the art to which the embodiments of the present invention belong.

It should be understood that various parts of the present invention may be implemented by means of hardware, software, firmware or a combination thereof In the embodiments above, a plurality of steps or methods may be implemented by means of software or firmware stored in a memory and executed by an appropriate instruction execution system. For example, if implemented by means of hardware, likewise in another embodiment, it can be implemented by means of any one or a combination of the following techniques commonly known in the art: a discrete logical circuit having a logical gate circuit used for implementing a logical function for a data signal, an application-specific integrated circuit having an appropriate combinational logical gate circuit, a programmable gate array (PGA), a field programmable gate array (FPGA), etc.

Those of ordinary skill in the art shall understand that the implementation of all or a part of the steps carried out in the above-mentioned embodiment methods may be achieved by instructing relevant hardware with a program. The program may be stored in a computer readable storage medium, and when executed, the program comprises one of the steps in the method embodiments or a combination thereof.

In addition, various functional units in various embodiments of the present invention may be integrated into a processing module, or each of the units may exist alone physically, or two or more than two units may be integrated into a module. The above-mentioned integrated module may be implemented in the form of hardware, and may also be implemented in the form of a software functional module. When implemented in the form of a software functional module and sold or used as an independent product, the integrated module may also be stored in a computer readable storage medium.

The above-mentioned storage medium may be a read-only memory, a magnetic disk, or an optical disk, etc.

In the description of the specification, the description of the reference terms such as "one embodiment", "some embodiments", "an example", "a specific example" or "some examples" is intended to mean that a particular feature, structure, material or characteristic described in connection with the embodiment or example is included in at least one embodiment or example of the present invention. In the present description, the illustrative expression of the above-mentioned terms does not necessarily refer to the same embodiment or example. Furthermore, the particular feature, structure, material or characteristic described may be combined in a suitable manner in any one or a plurality of embodiments or examples.

Although the embodiments of the present invention have been shown and described above, it should be understood that the embodiments above are exemplary and shall not be understood as limitations to the present invention. Those of ordinary skill in the art may make changes, modifications, replacements and variations to the embodiments above within the scope of the present invention.

What is claimed is:

1. A method for prompting based on smart glasses, comprising:
   acquiring current scenario information including a page of a slide show presentation being projected via a projector and being presented via the smart glasses, an image of the page being captured by the smart glasses;
   determining prompt information corresponding to the captured image of the page based upon a preconfigured information base, wherein the preconfigured information base stores a picture showing the page, prompt information including extended content for explaining the page, and an association relationship between the page and the prompt information, and wherein the extended content is not displayed via the projector;
   receiving a voice control instruction enabling a part of the prompt information that includes the extended content for explaining a selected part of the captured image; and
   displaying, via the smart glasses, the part of the prompt information based upon the voice control instruction.

2. The method of claim 1, further comprising establishing the information base by saving incoming scenario information and incoming prompt information corresponding to the scenario information in the information base.

3. The method of claim 1, further comprising establishing the information base by saving incoming scenario information acquired by a user from public resources and incoming prompt information corresponding to the scenario information in the information base.

4. The method of claim 1, wherein said acquiring includes capturing a current scenario to acquire an image of the current scenario.

5. The method of claim 4, wherein said capturing includes:
   capturing the scenario continuously to acquire the image of the current scenario;
   capturing the current scenario according to an event trigger instruction;
   or a combination thereof.

6. The method of claim 5, wherein the event trigger instruction includes:
   a touch instruction given by a user;
   a voice control instruction given by the user;
   a trigger instruction sent by the user via a user device;
   or a combination thereof.

7. The method of claim 1, wherein said acquiring includes receiving the current scenario information sent by a device that is located where the current scenario is located.

8. The method of claim 1, wherein said displaying includes:
   judging whether the prompt information corresponding to the current scenario information is to be displayed; and displaying the prompt information via the smart glasses based upon said judging.

9. The method of claim 8, wherein said judging comprises:
judging that the prompt information is to be displayed based upon all prompt information being enabled;
judging that the prompt information is to be displayed based upon the prompt information corresponding to the current scenario being enabled;
or a combination thereof.

10. An apparatus for prompting based on smart glasses, comprising one or more processors associated with the smart glasses and being configured to:
acquire current scenario information including a page of a slide show presentation being projected via a projector and being presented via the smart glasses, an image of the page being captured by the smart glasses;
determine prompt information corresponding to the captured image of the page based upon a preconfigured information base, wherein the preconfigured information base stores a picture showing the page, prompt information including extended content for explaining the page, and an association relationship between the page and the prompt information, and wherein the extended content not being displayed via the projector;
receiving a voice control instruction enabling a part of the prompt information that includes the extended content for explaining a selected part of the captured image; and
display, via the smart glasses, the part of the prompt information based upon the voice control instruction.

11. The apparatus of claim 10, wherein said one or more processors are configured to establish the information base by saving incoming scenario information and incoming prompt information corresponding to the scenario information in the information base.

12. The apparatus of claim 10, wherein said one or more processors are configured to establish the information base by saving incoming scenario information acquired by a user from public resources and incoming prompt information corresponding to the scenario information in the information base.

13. The apparatus of claim 10, wherein said one or more processors are configured to capture a current scenario to acquire an image of the current scenario.

14. The apparatus of claim 13, wherein said one or more processors are configured to:
capture the scenario continuously to acquire the image of the current scenario; or
capture the current scenario according to an event trigger instruction.

15. The apparatus of claim 14, wherein the event trigger instruction includes:
a touch instruction given by a user;
a voice control instruction given by the user; or
a trigger instruction sent by the user via a user device.

16. The apparatus of claim 10, wherein said one or more processors are configured to receive the current scenario information sent by a device that is located where the current scenario is located.

17. A non-transitory computer storage medium including at least one program for prompting based on smart glasses when implemented by a processor, comprising:
instruction for acquiring current scenario information including a page of a slide show presentation being projected via a projector and being presented via the smart glasses, an image of the page being captured by the smart glasses;
instruction for determining prompt information corresponding to the page number based upon a preconfigured information base, wherein the preconfigured information base stores a picture showing the page, prompt information including extended content for explaining the page, and an association relationship between the page and the prompt information, and wherein the extended content not being displayed via the projector;
receiving a voice control instruction enabling a part of the prompt information that includes the extended content for explaining a selected part of the captured image; and
instruction for displaying, via the smart glasses, the part of the prompt information based upon the voice control instruction.

18. The method of claim 1, further comprising establishing the information base by inputting in the information base each page of the slide show presentation and the prompt information respectively corresponding to each page.

19. The method of claim 1, further comprising establishing the information base by inputting in the information base a page number of the page of the slide show presentation and the prompt information respectively corresponding to the page number.

20. The method of claim 1, wherein said displaying comprises displaying the part of the prompt information via the smart glasses upon an arranged sensor of the smart glasses determining that an eyeball stares at the page via the smart glasses for a staring time exceeding a set threshold.

* * * * *